(12) United States Patent
McCutchin et al.

(10) Patent No.: US 11,665,504 B2
(45) Date of Patent: *May 30, 2023

(54) POWER TOOL GEOFENCE TRACKING AND DASHBOARD

(71) Applicant: MILWAUKEE ELECTRIC TOOL CORPORATION, Brookfield, WI (US)

(72) Inventors: Cory J. McCutchin, Menomonee Falls, WI (US); Chad E. Jones, Jackson, WI (US); Ryan D. Garlock, New Berlin, WI (US); Christina M. Balda, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/557,487

(22) Filed: Dec. 21, 2021

(65) Prior Publication Data

US 2022/0116738 A1 Apr. 14, 2022

Related U.S. Application Data

(63) Continuation of application No. 16/719,416, filed on Dec. 18, 2019, now Pat. No. 11,246,004.

(60) Provisional application No. 62/834,724, filed on Apr. 16, 2019.

(51) Int. Cl.
*H04W 4/021* (2018.01)
*G06Q 10/087* (2023.01)
*H04W 4/35* (2018.01)

(52) U.S. Cl.
CPC .......... *H04W 4/022* (2013.01); *G06Q 10/087* (2013.01); *H04W 4/35* (2018.02)

(58) Field of Classification Search
CPC ....... H04W 4/022; H04W 4/35; G06Q 10/087
See application file for complete search history.

(56) References Cited

U.S. PATENT DOCUMENTS

| 6,774,811 | B2 | 8/2004 | Kaufman et al. |
| 7,135,967 | B2 | 11/2006 | Culpepper et al. |
| 7,164,986 | B2 | 1/2007 | Humphries et al. |
| 7,180,422 | B2 | 2/2007 | Milenkovic et al. |
| 7,493,276 | B2 | 2/2009 | Adams et al. |
| 7,557,709 | B2 | 7/2009 | Flores et al. |
| 7,598,855 | B2 | 10/2009 | Scalisi et al. |
| 7,728,724 | B1 | 6/2010 | Scalisi et al. |

(Continued)

FOREIGN PATENT DOCUMENTS

| CN | 101609138 A | 12/2009 |
| CN | 105100222 A | 11/2015 |

(Continued)

*Primary Examiner* — Marcus Hammonds
(74) *Attorney, Agent, or Firm* — Michael Best & Friedrich LLP

(57) ABSTRACT

Methods and systems for power tool geofence tracking. One embodiment provides a method for power tool geofence tracking and dashboard display. The method includes determining, using an electronic processor with a transceiver, a location of one or more power tool devices and generating, using the electronic processor, a dashboard to simultaneously display a location-based inventory, indication of number of missing tool, and geofence setup of power tool devices within the inventory. The method also includes displaying, using the electronic processor, the dashboard on an electronic display.

13 Claims, 13 Drawing Sheets

(56) References Cited

U.S. PATENT DOCUMENTS

| | | |
|---|---|---|
| 7,848,765 B2 | 12/2010 | Phillips et al. |
| 7,911,379 B2 | 3/2011 | Cameron |
| 8,018,329 B2 | 9/2011 | Morgan et al. |
| 8,022,812 B2 | 9/2011 | Beniyama et al. |
| 8,065,079 B2 | 11/2011 | Rogers |
| 8,081,072 B2 | 12/2011 | Scalisi et al. |
| 8,102,256 B2 | 1/2012 | Scalisi et al. |
| 8,164,431 B2 | 4/2012 | Morgan et al. |
| 8,217,772 B2 | 7/2012 | Morgan et al. |
| 8,224,355 B2 | 7/2012 | Beydler et al. |
| 8,244,468 B2 | 8/2012 | Scalisi et al. |
| 8,320,931 B2 | 11/2012 | Ward et al. |
| 8,325,025 B2 | 12/2012 | Morgan et al. |
| 8,326,315 B2 | 12/2012 | Phillips et al. |
| 8,362,887 B2 | 1/2013 | Morgan et al. |
| 8,380,349 B1 | 2/2013 | Hickman et al. |
| 8,421,618 B2 | 4/2013 | Scalisi et al. |
| 8,421,619 B2 | 4/2013 | Scalisi et al. |
| 8,432,807 B2 | 4/2013 | Kohn et al. |
| 8,497,774 B2 | 7/2013 | Scalisi et al. |
| 8,508,349 B2 | 8/2013 | Morgan et al. |
| 8,531,289 B2 | 9/2013 | Scalisi et al. |
| 8,536,999 B2 | 9/2013 | Holeman et al. |
| 8,542,113 B2 | 9/2013 | Scalisi et al. |
| 8,581,712 B2 | 11/2013 | Morgan et al. |
| 8,581,713 B1 | 11/2013 | Morgan et al. |
| 8,593,276 B2 | 11/2013 | Doyle |
| 8,606,260 B2 | 12/2013 | Chatterjee |
| 8,620,393 B2 | 12/2013 | Bornstein et al. |
| 8,626,187 B2 | 1/2014 | Grosman et al. |
| 8,653,956 B2 | 2/2014 | Berkobin et al. |
| 8,659,404 B2 | 2/2014 | Morgan et al. |
| 8,682,300 B2 | 3/2014 | Stopel et al. |
| 8,686,841 B2 | 4/2014 | Macheca et al. |
| 8,766,794 B2 | 7/2014 | Ferguson et al. |
| 8,774,827 B2 | 7/2014 | Scalisi et al. |
| 8,862,150 B2 | 10/2014 | Phillips et al. |
| 8,909,248 B2 | 12/2014 | Phillips et al. |
| 8,965,406 B2 | 2/2015 | Henderson |
| 8,971,930 B2 | 3/2015 | Li et al. |
| 8,977,288 B2 | 3/2015 | Abraham et al. |
| 9,002,380 B2 | 4/2015 | Sabatelli et al. |
| 9,053,625 B2 | 6/2015 | Daniel |
| 9,060,248 B1 | 6/2015 | Coulombe et al. |
| 9,078,098 B1 | 7/2015 | Cronin |
| 9,111,189 B2 | 8/2015 | Scalisi et al. |
| 9,119,038 B2 | 8/2015 | Woods et al. |
| 9,201,414 B2 | 12/2015 | Kantzes et al. |
| 9,305,196 B2 | 4/2016 | Schoner et al. |
| 9,307,361 B2 | 4/2016 | Ziskind et al. |
| 9,351,114 B2 | 5/2016 | Chatterjee et al. |
| 9,357,348 B2 | 5/2016 | Evans et al. |
| 9,369,842 B2 | 6/2016 | Cronin |
| 9,398,409 B2 | 7/2016 | Porter |
| 9,432,806 B2 | 8/2016 | Zises |
| 9,432,807 B2 | 8/2016 | Kern, Jr. et al. |
| 9,467,862 B2 | 10/2016 | Zeiler et al. |
| 9,538,335 B1 | 1/2017 | Bank et al. |
| 9,560,426 B1 | 1/2017 | Daniel |
| 9,560,481 B1 | 1/2017 | Yocam et al. |
| 9,591,445 B2 | 3/2017 | Zises |
| 9,609,473 B2 | 3/2017 | Zhang |
| 9,615,210 B2 | 4/2017 | Evans et al. |
| 9,633,370 B2 | 4/2017 | Porter |
| 9,646,477 B2 | 5/2017 | Fernandez et al. |
| 9,654,923 B2 | 5/2017 | Phillips et al. |
| 9,668,096 B2 | 5/2017 | Phillips et al. |
| 9,699,612 B2 | 7/2017 | Evans et al. |
| 9,769,604 B2 | 9/2017 | Daoura et al. |
| 9,774,410 B2 | 9/2017 | Daoura et al. |
| 9,774,994 B2 | 9/2017 | Chen et al. |
| 9,786,153 B2 | 10/2017 | London |
| 9,807,601 B2 | 10/2017 | Cronin |
| 9,820,016 B2 | 11/2017 | Ljung et al. |
| 9,820,101 B2 | 11/2017 | McCormick |
| 9,820,231 B2 | 11/2017 | Gorgenyi et al. |
| 9,838,843 B1 | 12/2017 | Bajaj et al. |
| 9,867,000 B2 | 1/2018 | Zises |
| 9,911,296 B2 | 3/2018 | Luke et al. |
| 9,933,270 B2 | 4/2018 | Scalisi et al. |
| 9,947,210 B2 | 4/2018 | de Barros Chapiewski et al. |
| 9,955,298 B1 | 4/2018 | Haney |
| 9,955,305 B2 | 4/2018 | de Barros Chapiewski et al. |
| 9,961,618 B2 | 5/2018 | Abraham et al. |
| 9,965,941 B2 | 5/2018 | de Barros Chapiewski et al. |
| 9,965,942 B2 | 5/2018 | de Barros Chapiewski et al. |
| 9,972,191 B2 | 5/2018 | de Barros Chapiewski et al. |
| 9,990,654 B2 | 6/2018 | Porter |
| 9,998,860 B2 | 6/2018 | Nicholson et al. |
| 9,998,864 B2 | 6/2018 | Kumar et al. |
| 10,002,515 B2 | 6/2018 | de Barros Chapiewski et al. |
| 10,020,951 B2 | 7/2018 | Ram et al. |
| 10,022,853 B1 | 7/2018 | Mollica |
| 10,051,417 B2 | 8/2018 | Borghei |
| 10,131,042 B2 | 11/2018 | Mergener et al. |
| 10,149,142 B2 | 12/2018 | Coulis et al. |
| 10,231,084 B2 | 3/2019 | Bagchi et al. |
| 10,339,496 B2 | 7/2019 | Matson et al. |
| 10,405,136 B2 | 9/2019 | Zises |
| 10,448,196 B2 | 10/2019 | Kern, Jr. et al. |
| 10,531,304 B2 | 1/2020 | Zeiler et al. |
| 2006/0061469 A1 | 3/2006 | Jaeger et al. |
| 2007/0173265 A1 | 7/2007 | Gum |
| 2007/0229350 A1 | 10/2007 | Scalisi et al. |
| 2011/0148626 A1 | 6/2011 | Acevedo |
| 2012/0089492 A1 | 4/2012 | Scalisi et al. |
| 2012/0238291 A1 | 9/2012 | Scalisi et al. |
| 2013/0072226 A1 | 3/2013 | Thramann |
| 2013/0157691 A1 | 6/2013 | Beydler et al. |
| 2014/0253377 A1 | 9/2014 | Scalisi et al. |
| 2014/0258201 A1 | 9/2014 | Finlow-Bates |
| 2015/0065167 A1 | 3/2015 | Scalisi et al. |
| 2015/0095157 A1 | 4/2015 | McDevitt |
| 2015/0097674 A1 | 4/2015 | Mondal et al. |
| 2015/0149542 A1 | 5/2015 | Jain et al. |
| 2015/0161553 A1 | 6/2015 | Eggleston |
| 2015/0163632 A1 | 6/2015 | Phillips et al. |
| 2015/0181511 A1 | 6/2015 | Abraham et al. |
| 2015/0199704 A1 | 7/2015 | Gottesman et al. |
| 2015/0237470 A1 | 8/2015 | Mayor et al. |
| 2015/0286209 A1 | 10/2015 | Kreuzer et al. |
| 2015/0348214 A1 | 12/2015 | Jain |
| 2015/0373091 A1 | 12/2015 | Sanghavi et al. |
| 2015/0379624 A1 | 12/2015 | Poornachandran et al. |
| 2016/0088482 A1 | 3/2016 | Zeiler et al. |
| 2016/0381502 A1 | 12/2016 | Kern, Jr. et al. |
| 2017/0099577 A1 | 4/2017 | Yocam et al. |
| 2017/0148287 A1 | 5/2017 | Fernandez et al. |
| 2017/0171713 A1 | 6/2017 | Hou et al. |
| 2017/0186039 A1 | 6/2017 | Porter |
| 2017/0289734 A1 | 10/2017 | Yocam et al. |
| 2017/0343966 A1 | 11/2017 | Schadow et al. |
| 2017/0352254 A1 | 12/2017 | de Barros Chapiewski et al. |
| 2017/0353829 A1 | 12/2017 | Kumar et al. |
| 2017/0366933 A1 | 12/2017 | Chen et al. |
| 2018/0020402 A1 | 1/2018 | Emmanuel et al. |
| 2018/0020407 A1 | 1/2018 | Emmanuel et al. |
| 2018/0026808 A1 | 1/2018 | Scalisi et al. |
| 2018/0049132 A1 | 2/2018 | Gorgenyi et al. |
| 2018/0096585 A1 | 4/2018 | London |
| 2018/0109919 A1 | 4/2018 | Zises |
| 2018/0124558 A1 | 5/2018 | Stampfl et al. |
| 2018/0124564 A1 | 5/2018 | Phillips et al. |
| 2018/0225950 A1 | 8/2018 | de Barros Chapiewski et al. |
| 2018/0225951 A1 | 8/2018 | de Barros Chapiewski et al. |
| 2018/0225952 A1 | 8/2018 | de Barros Chapiewski et al. |
| 2018/0225953 A1 | 8/2018 | de Barros Chapiewski et al. |
| 2018/0227708 A1 | 8/2018 | de Barros Chapiewski et al. |
| 2018/0293862 A1 | 10/2018 | Mondal et al. |
| 2019/0026510 A1 | 1/2019 | Hall et al. |
| 2019/0364383 A1 | 11/2019 | Zises |

(56) References Cited

U.S. PATENT DOCUMENTS

FOREIGN PATENT DOCUMENTS

| | | |
|---|---|---|
| DE | 102017205344 A1 | 12/2017 |
| WO | 2012000107 A1 | 1/2012 |
| WO | 2014130072 A1 | 8/2014 |
| WO | 2016165869 A2 | 10/2016 |
| WO | 2018009521 A1 | 1/2018 |

POWER TOOL GEOFENCE TRACKING AND DASHBOARD

RELATED APPLICATIONS

This application is a continuation of U.S. patent application Ser. No. 16/719,416, filed on Dec. 18, 2019, which claims priority to U.S. Provisional Patent Application No. 62/834,724, filed on Apr. 16, 2019, the entire contents of which are incorporated herein by reference.

FIELD

This application relates to geofence tracking for power tool devices and corresponding graphical user interfaces displayed on a mobile communications device.

SUMMARY

User interfaces of tracking systems for large inventories can be cumbersome and complicated, leading to frustrating and inefficient user experiences that require multiple user steps to gather desired information, which slows adoption and usage of such systems. Further, tracking systems designed for generic inventory, rather than particularly for power tool devices, lack features and functionality particularly helpful in the power tool industry context. Embodiments described herein provide, among other things, power tool tracking systems, methods and related user interfaces, with improved usability through efficient tracking data aggregation, analysis, and presentation. For example, in some embodiments, tracking data is analyzed to determine multiple tool tracking statistics and simultaneously displayed on a single dashboard along with identifying information and configuration options.

One embodiment provides a mobile communications device for power tool geofence tracking. The mobile communications device includes a transceiver configured to enable communications between the mobile communications device and one or more power tool devices. The mobile communications device also includes an electronic display and an electronic processor communicatively coupled to the transceiver and the electronic display. The electronic processor is configured to determine a location of the one or more power tool devices and generate a dashboard. The dashboard simultaneously displays an identity and location associated with a tool inventory and a link to a geofence boundary setup screen. The geofence boundary setup screen is configured to define a geofence boundary for the tool inventory. The dashboard also simultaneously displays inventory data of the tool inventory including an indication of a number of missing tools, a number of tools with suggested service, a number of tools missing for a specified period of time, and a number of tools outside of the geofence. The dashboard also simultaneously display a link to conduct a wireless inventory audit for the inventory. The electronic processor is also configured to display, on the electronic display, the dashboard.

Another embodiment provides a method for power tool geofence tracking and dashboard display. The method includes determining, using an electronic processor with a transceiver, a location of one or more power tool devices and generating, using the electronic processor, a dashboard to simultaneously display a location-based inventory, indication of number of missing tool, and geofence boundary setup of power tool devices within the inventory. The method also includes displaying, using the electronic processor, the dashboard on an electronic display.

Another embodiment provides a mobile communications device for power tool geofence tracking. The mobile communications device includes a transceiver configured to enable communications between the mobile communications device and one or more power tool devices and an electronic display. The mobile communications device also includes an electronic processor communicatively coupled to the transceiver and the electronic display. The electronic processor is configured to determine a location of the one or more power tool devices and generate a dashboard. The dashboard simultaneously displays an identity and location associated with a tool inventory and a link to a geofence boundary setup screen. The geofence boundary setup screen is configured to define a geofence boundary for the tool inventory. The dashboard also simultaneously displays a link to conduct a wireless inventory audit for the inventory. The mobile communications device is also configured to display, on the electronic display, the dashboard.

Another embodiment provides a remote server configured to populate a geofence boundary with a first plurality of reference points and populate an area around one or more power tools with a second plurality of reference points. The remote server is also configured to run the first plurality of reference points and the second plurality of reference points through a clustering function and determine whether one or more of the second plurality of reference points is in a same cluster as one or more of the first plurality of reference points. The remote server is further configured to determine that the one or more power tools is within the geofence boundary when one or more of the second plurality of reference points is in the same cluster as one or more of the first plurality of reference points.

In some embodiments of the system, the remote server is further configured to determine that the one or more power tools is outside the geofence boundary based on determining that no cluster includes both at least one of the second plurality of reference points and at least one of the first plurality of reference points.

In some embodiments of the system, the remote server is configured to transmit an indication indicative of whether the one or more power tools is within the geofence.

Another embodiment provides a method for determining whether a power tool is within a geofence boundary. The method includes populating the modified geofence boundary with a first plurality of reference points and populating area around the one or more power tools with a second plurality of reference points. The method also includes running the first plurality of reference points and the second plurality of reference points through a clustering function and determining whether one or more of the second plurality of reference points is in a same cluster as one or more of the first plurality of reference points. The method further includes determining that the one or more power tools device is within the modified geofence boundary when one or more of the second plurality of reference points is in the same cluster as one or more of the first plurality of reference points.

In some embodiments of the method, the remote server determines that the one or more power tools is outside the geofence boundary based on determining that no cluster includes both at least one of the second plurality of reference points and at least one of the first plurality of reference points.

In some embodiments of the method, the remote server transmits an indication indicative of whether the one or more power tools is within the geofence.

DETAILED DESCRIPTION OF THE INVENTION

Figure 1:
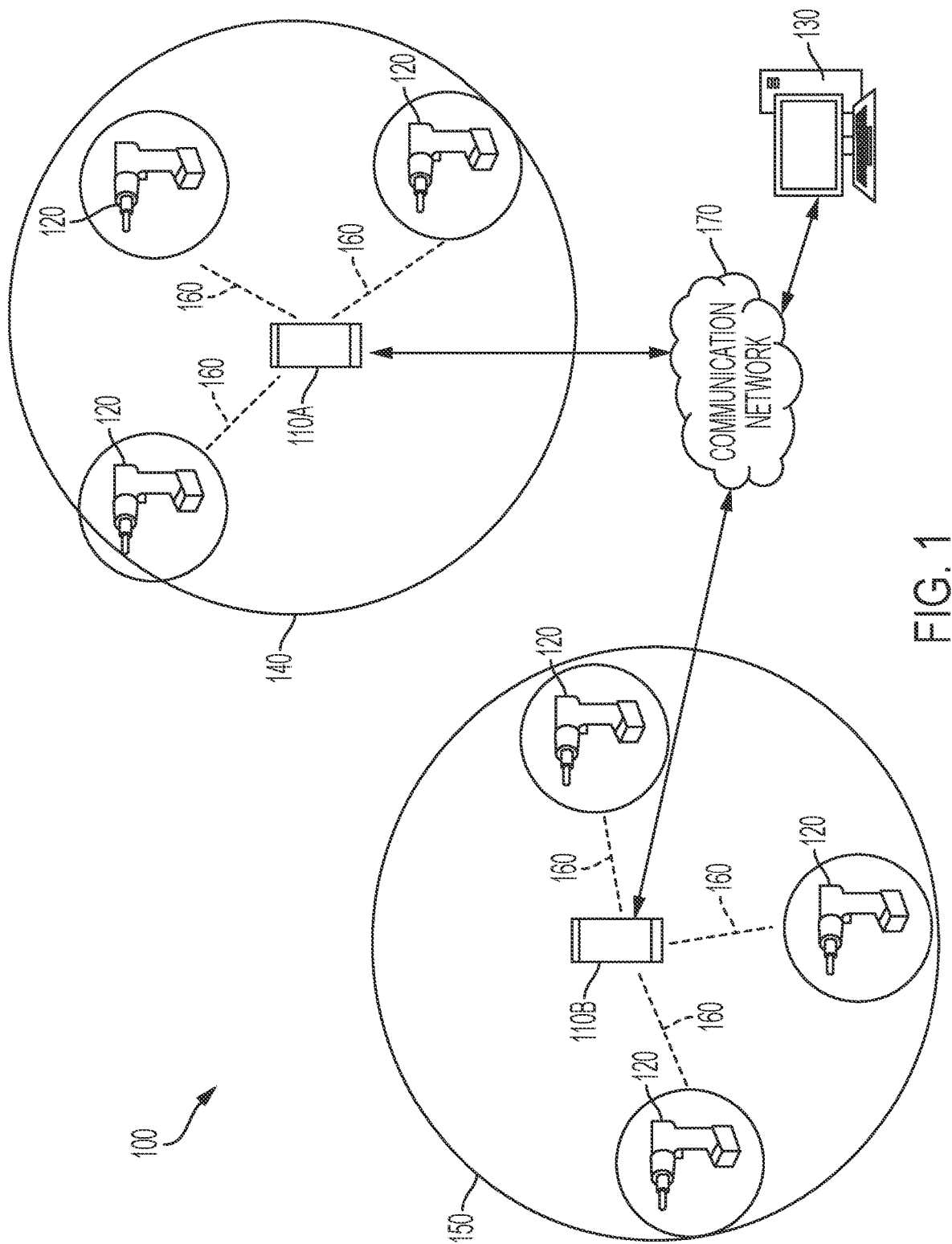
FIG. 1 illustrates a power tool geofence tracking system in accordance with some embodiments.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors, or cloud processing/cloud computing configurations.

FIG. 1 illustrates a power tool geofence tracking system 100 in accordance with some embodiments. In the example illustrated, the power tool geofence tracking system 100 includes a plurality of mobile communications devices 110, a plurality of power tool devices 120, and a remote server 130. The plurality of mobile communications devices 110 may be singularly referred to as a mobile communications device 110 or one or more mobile communications devices 110. In the example illustrated, the plurality of mobile communications devices 110 includes a first mobile communications device 110A and a second mobile communications device 110B. The plurality of power tool devices 120 may be singularly referred to as a power tool device 120 or one or more power tool devices 120.

Each mobile communications device 110 communicates with one or more power tool devices 120 that are located within a wireless communication range of the mobile communications device 110. The power tool geofence tracking system 100 is used to track locations of the plurality of power tool devices 120 of a user or an organization. For example, the first mobile communications device 110A communicates with a first one or more power tool devices 120 within a first location 140 to track the first one or more power tool devices 120. The first location 140 is for example, a worksite location, a foreman's office location, or the like. Similarly, the second mobile communications device 110B communication with a second one or more power tool devices 120 within a second location 150 to track the second one or more power tool devices 120. The second location 150 is for example, a second worksite location, another office location, or the like. Accordingly, the plurality of mobile communications devices 110 can be used to track the plurality of power tool devices 120 across multiple locations. The power tool geofence tracking system 100 may include more or fewer components than those illustrated in FIG. 1 and may perform functions other than those described herein.

The mobile communications device 110 is, for example, a smart telephone, a tablet computer, a smart watch, a personal digital assistant and the like. The power tool device 120 is any motorized or non-motorized power tool device, for example, a drill-driver, a hammer drill, a rotary hammer, a miter saw, a jigsaw, a work light, a work radio, a dust extractor, ruggedized tracking device (e.g., for securing to construction equipment or materials), and the like, or a power tool battery pack configured to power a power tool device, such as the aforementioned power tool devices. The plurality of mobile communications devices 110 communicate with the plurality of power tool devices 120 over a wireless connection 160, for example, a Bluetooth® or ZigBee® connection.

The plurality of mobile communications devices 110 also communicate with a remote server 130 over a communication network 170. In some embodiments, the communication network 170 may be an Internet network, a cellular network, another network, or a combination thereof. The mobile communications device 110 can forward to the remote server 130 at least some of the information received from the power tool devices 120. The remote server 130 provides additional storage and processing power and thereby enables the geofence tracking system 100 to encompass more power tool devices 120 without being limited to the storage and processing capabilities of the mobile communications device 110.

In some embodiments, the plurality of mobile communications devices 110 are issued by a single organization or entity to track the power tool devices 120 that belong to the organization or entity. In some embodiments, each user within an organization or entity has their own power tool devices 120 that can be tracked by one or more mobile communications devices 110. In other embodiments, a single mobile communications device 110 may be used to track inventory of a single user. In further embodiments, one or more of the plurality of mobile communications devices 110 are owned and operated by independent users.

The power tool devices 120 can be added to an inventory using the mobile communications device 110. For example, a user can use the mobile communications device 110 to pair with a nearby power tool device 120. Once the mobile communications device 110 receives identification information of the power tool device 120, the user may add the power tool device 120 to the inventory of the user or the organization. Power tool devices 120 can also be manually added to the inventory by entering identification information of the power tool devices into the mobile communications device 110 or another external electrical device in communication with the remote server 130. The inventory for each user or organization may be stored in a memory of the remote server 130, in the mobile communications devices 110, or both. The inventory may include, for example, one or more of a list of power tool devices (e.g., identified by a serial number or another identification label), an associated user(s), an associated organization(s), a power tool type, an assigned worksite or location, collectively, inventory data.

Figure 2:
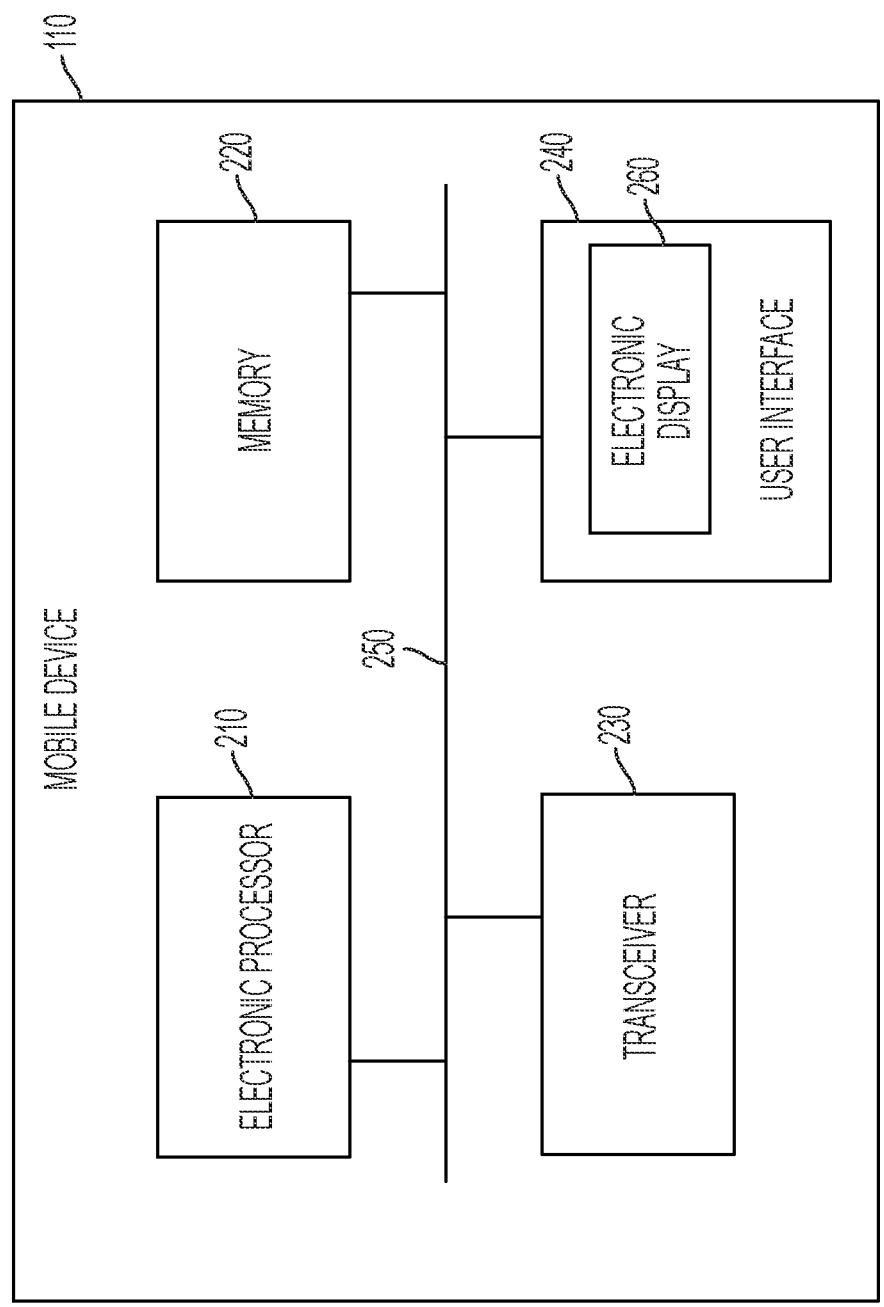
FIG. 2 is a block diagram of mobile communications device of the power tool geofence tracking system of FIG. 1 in accordance with some embodiments.

FIG. 2 is a block diagram of one example embodiment of the mobile communications device 110. In the example illustrated, the mobile communications device 110 includes an electronic processor 210, a memory 220, a transceiver 230, and a user interface 240. The electronic processor 210, the memory 220, the transceiver 230, and the user interface 240 communicate over one or more control and/or data buses (for example, a communication bus 250). The memory 220 includes read only memory (ROM), random access memory (RAM), other non-transitory computer-readable media, or a combination thereof. The electronic processor 210 is configured to communicate with the memory 220 to store data and retrieve stored data. The electronic processor 210 is configured to receive instructions and data from the memory 220 and execute, among other things, the instructions. In particular, the electronic processor 210 executes instructions stored in the memory 220 to perform the methods described herein.

The transceiver 230 facilitates communication between the mobile communications device 110 and the power tool devices 120, between the mobile communications device 110 and the communication network 170, or both. The mobile communications device 110 communicates with the remote server 130 over the communication network 170 via the transceiver. For example, the transceiver 230 may include a short-range transceiver to facilitate communication with the power tool devices 120 over a Bluetooth® connection and a long-range transceiver to facilitate communication with the communication network 170 over a Wi-Fi™ or a Cellular connection. In some embodiments, the transceiver 230 of the mobile communications device 110 may include separate transmission and receiving components, for example, a transmitter and a receiver, rather than a joint transmitter-receiver.

The user interface 240 includes one or more input components and one or more output components. Particularly, the user interface 240 includes an electronic display 260 to display information regarding the power tool devices 120 to a user of the mobile communications device 110. The electronic display 260 is, for example, a touch screen display that can serve as both an input and an output component. In some embodiments, the user interface 240 includes further inputs (e.g., buttons, switches, dials) and outputs (e.g., a tactile output generator, speaker, etc.).

In some embodiments, the remote server 130 (see FIG. 1) has a similar configuration as the mobile communications device 110 shown in FIG. 2 including an electronic processor, memory, and transceiver coupled by a communication bus, and, in some embodiments, a user interface. Additionally, the memory of the remote server 130 stores data and instructions and the electronic processor of the remote server 130 is configured to receive instructions and data from the memory 220 and execute, among other things, the instructions to perform the functions of the remote server 130 described herein. Further, the remote server 130 may include a single server or a plurality of servers, whether co-located or distributed.

Figure 3:
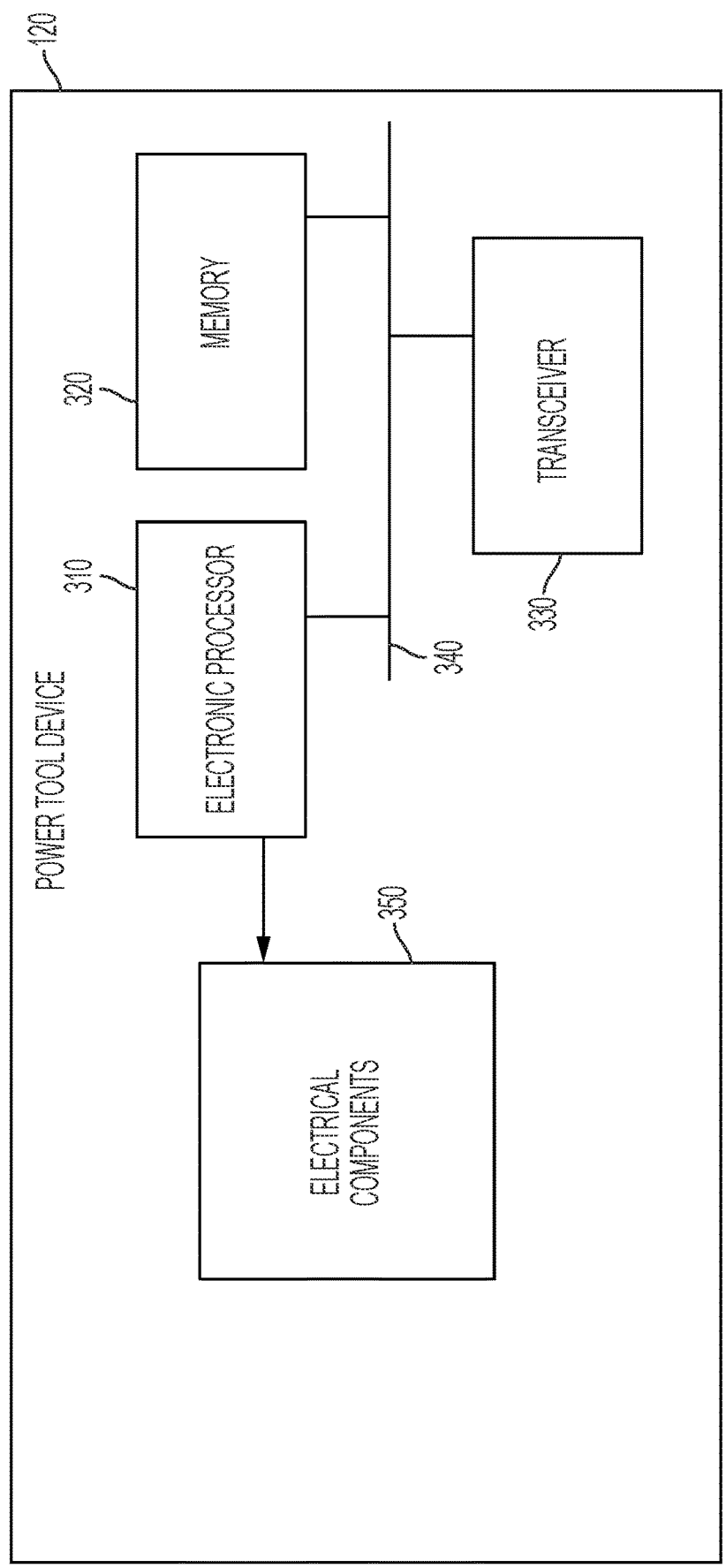
FIG. 3 is a block diagram of a power tool of the power tool geofence tracking system of FIG. 1 in accordance with some embodiments.

FIG. 3 is a block diagram of one example embodiment of the power tool device 120. In the example illustrated, the power tool device 120 includes a device electronic processor 310, a device memory 320, and a device transceiver 330. The device electronic processor 310, the device memory 320, and the device transceiver 330 communicate over one or more control and/or data buses (for example, a device communication bus 340). The device electronic processor 310, the device memory 320, and the device transceiver 330 are implemented similar to the electronic processor 210, the memory 220, and the transceiver 230 respectively. In one example, the device electronic processor 310 and the device memory 320 are part of a microcontroller unit of a motorized or non-motorized power tool or battery pack. In some embodiments, the power tool device 120 also optionally includes additional electronic components 350. For a motorized power tool (e.g., drill-driver, saw, and the like), the electronic components 350 include, for example, one or more of a power source, an inverter bridge, a motor (e.g., brushed or brushless), and the like. For a battery pack, the electronic components 350 include, for example, one or more of battery cells, a charge level fuel gauge, analog front ends, sensors, and the like. For a non-motorized power tool (e.g., a work light, a work radio, ruggedized tracking device, and the like), the electronic components include, for example, one or more of a lighting element (e.g., an LED), an audio element (e.g., a speaker), a power source, and the like. In some embodiments, the device transceiver 330 is within a separate housing along with another electronic processor and memory, and that separate housing selectively attaches to the power tool device 120, on an outside surface of the power tool device 120 or by being inserted into a receptacle of the power tool device 120. Accordingly, the wireless communication capabilities of the power tool device 120 may reside in part on a selectively attachable communication device, rather than integrated into the power tool device 120. Such selectively attachable communication devices may include electrical terminals that engage with reciprocal electrical terminals of the power tool device 120 to enable communication between the respective devices and enable the power tool device 120 to provide power to the selectively attachable communication device.

Figure 4:
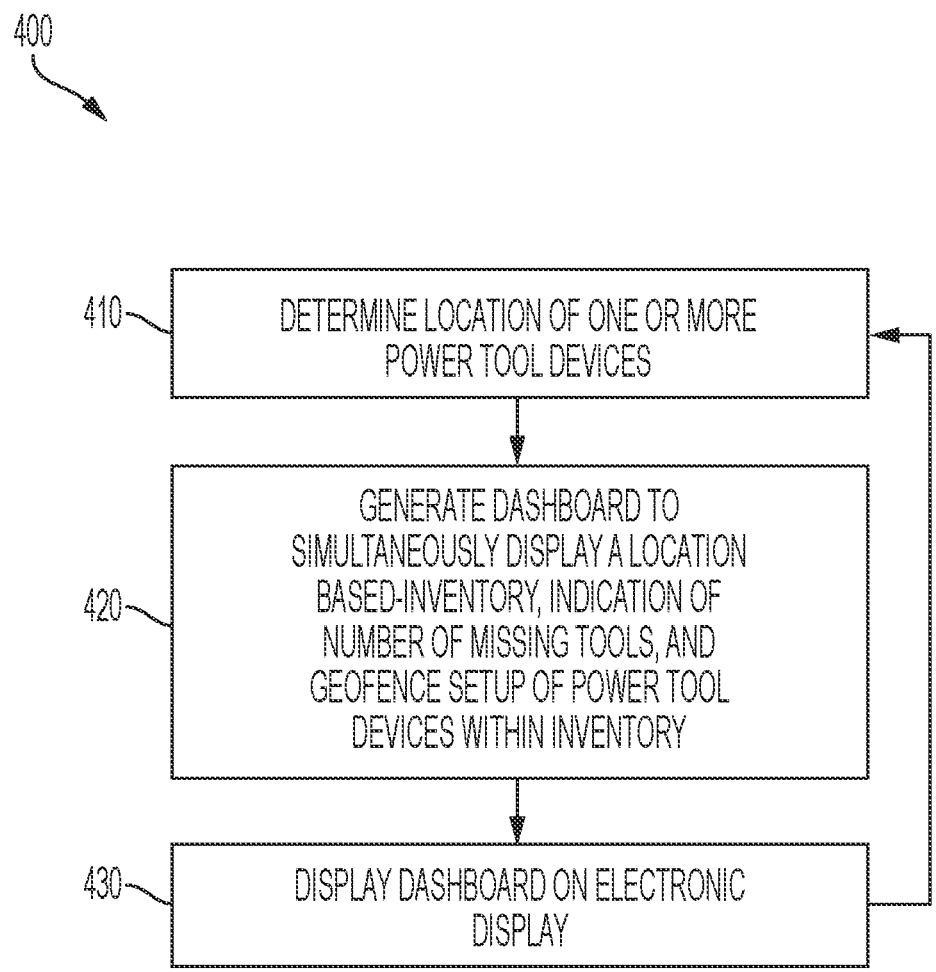
FIG. 4 is a flowchart of a method for power tool geofence tracking and dashboard display in accordance with some embodiment.

FIG. 4 is a flowchart of an example method 400 for power tool geofence tracking and dashboard display. In the example illustrated, the method 400 includes determining, using the electronic processor 210 with the transceiver 230, a location of one or more power tool devices 120 (at block 410). The mobile communications device 110 communicates with power tool devices 120 within a wireless communication range of the mobile communications device 110. The mobile communications device 110 communicates with the power tool devices 120 over, for example, a Bluetooth® connection, a ZigBee™ connection, and the like. In one example, the mobile communications device 110 provides a wireless advertisement. The power tool devices 120 that are within the wireless communication range of the mobile communications device 110 and that receive the wireless advertisement establish a connection with the mobile communications device 110 via the device transceiver 330. Particularly, the power tool devices 120 transmit identification information of the power tool devices 120 to the mobile communications device 110 in response to the wireless advertisement. In some embodiments, additionally or alternatively, the power tool devices 120 periodically transmit a beacon signal (including the identification information) via the device transceiver 330 based on an internal trigger, such as the elapsing of a timer, an internal schedule, sensed movement, or the like.

The mobile communications device 110 also receives location information over the communication network 170. For example, the mobile communications device 110 may include a separate global positioning system (GPS) receiver that determines a location based on signals received from one or more GPS satellites and provides the location to the electronic processor 210. The mobile communications device 110 then tags the location information to the identification information received from the power tool devices 120. That is, the mobile communications device 110 stores the identification information from the power tool device 120 along with the location information determined around the same time as when the mobile communications device 110 receives the identification information. The mobile communications device 110 forwards the identification information of the power tool devices 120 and the location information to the remote server 130 over the communication network 170. The remote server 130 may store the location information as the last seen location of the power tool device 120 to which the location information is tagged.

Referring to FIG. 1, in one example, the first mobile communications device 110A outputs a wireless advertisement. The first plurality of power tool devices 120 within the first location 140 provide respective identification information to the first mobile communications device 110A in response to the wireless advertisement (or internal trigger). The first mobile communications device 110A determines the location information of the first location 140 from the GPS signal received from the GPS satellite. The first mobile communications device 110A stores the location information of the first location 140 as the current location of the first plurality of power tool devices 120. The first mobile communications device 110A may also forward the current location of the first plurality of power tool devices 120 along with the identification information of the first plurality of power tool devices 120 for storage in the remote server 130 as the last seen location.

In some embodiments, one or more of the power tool devices 120 includes a GPS receiver for determining its own location independent of the mobile communications devices 110, and a long range wireless transceiver to, independent of the mobile communications devices 110, communicate the identification information along with the determined location information to the remote server 130 for storage as the last seen location. In some embodiments, the GPS receiver and long range wireless transceiver are within a separate housing that selectively attaches to the power tool device 120, on an outside surface of the power tool device 120 or by being inserted into a receptacle of the power tool device 120.

Accordingly, in some instances, the mobile communications devices 110 are configured to determine a location of one or more power tool devices 120 via direct interfacing with the power tool devices 120, as explained above. In some instances, the mobile communications devices 110 are configured to determine a location of one or more of the power tool devices 120 via communication with the remote server 130. For example, the mobile communications devices 110 is configured to query the remote server 130 for location information for one or more of the power tool devices 120 stored on the remote server 130 (e.g., aggregated from other mobile communications devices 110). Thus, in one example, the mobile communications device 110A is configured to determine the location information for power tool devices 120 in the second location 150 from the remote server 130, which was previously provided to the remote server 130 by the mobile communications device 110B or directly from the power tool device 120.

Figure 5:
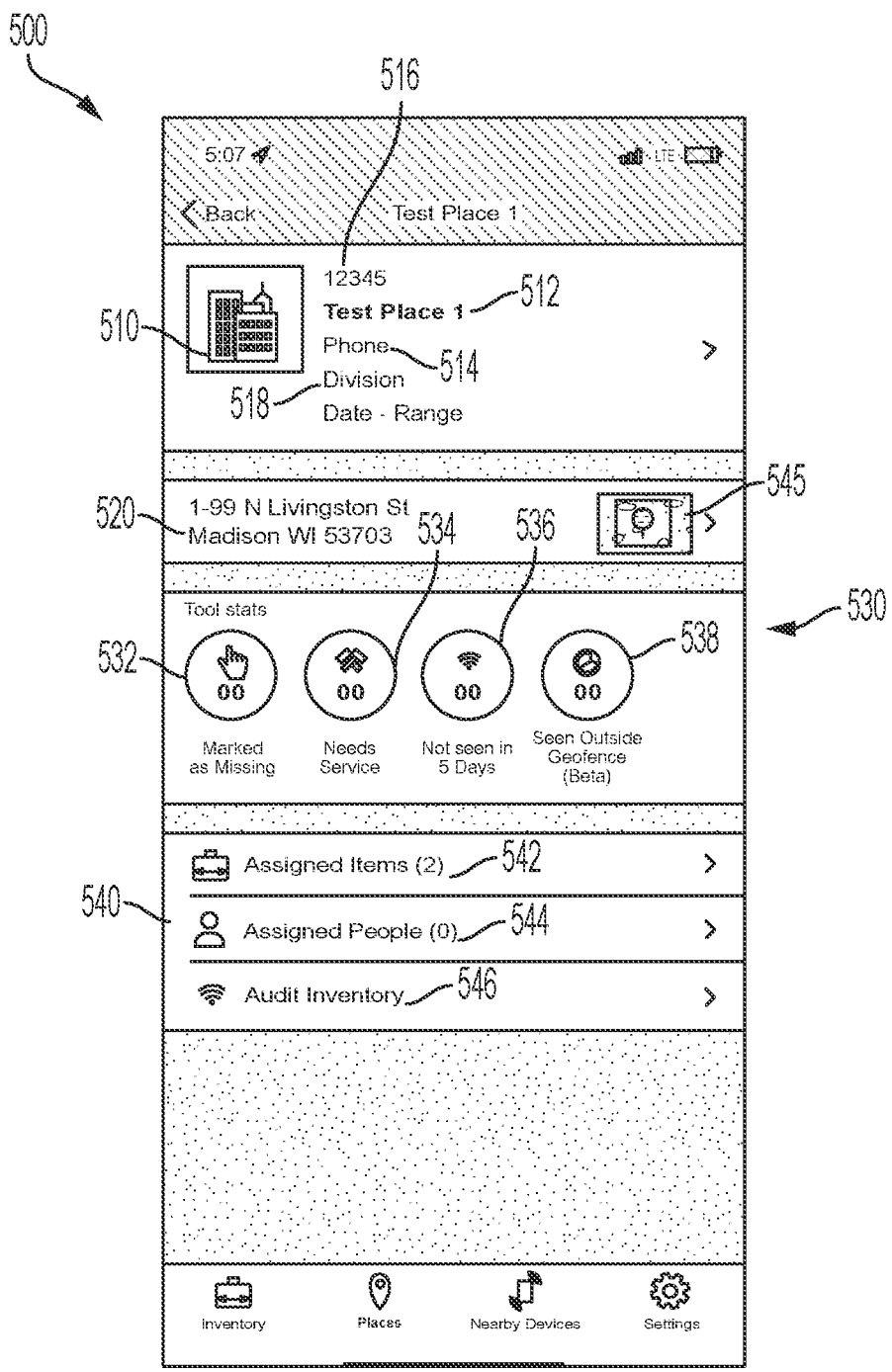
FIG. 5 illustrates a graphical user interface of the mobile communications device of FIG. 2 in accordance with some embodiments.

Returning to FIG. 4, the method 400 also includes generating, using the electronic processor 210, a dashboard 500 to simultaneously display a location-based inventory, indication of number of missing tools and geofence setup of power tool devices within the inventory (at block 420). FIG. 5 illustrates one example embodiment of the dashboard 500. The dashboard 500, as well as other dashboards described below, is generated by execution of a smart phone application, a tablet application, and the like (referred to as a mobile application) for display on the mobile communications device 110 as part of a graphical user interface of the mobile application. In the example illustrated, the dashboard 500 includes a location information section 510, a location address section 520, a tool stats section 530, and an inventory section 540 (that is, location-based inventory). The location information section 510 includes information regarding a specific location, for example, the first location 140, the second location 150, and the like.

Figure 6:
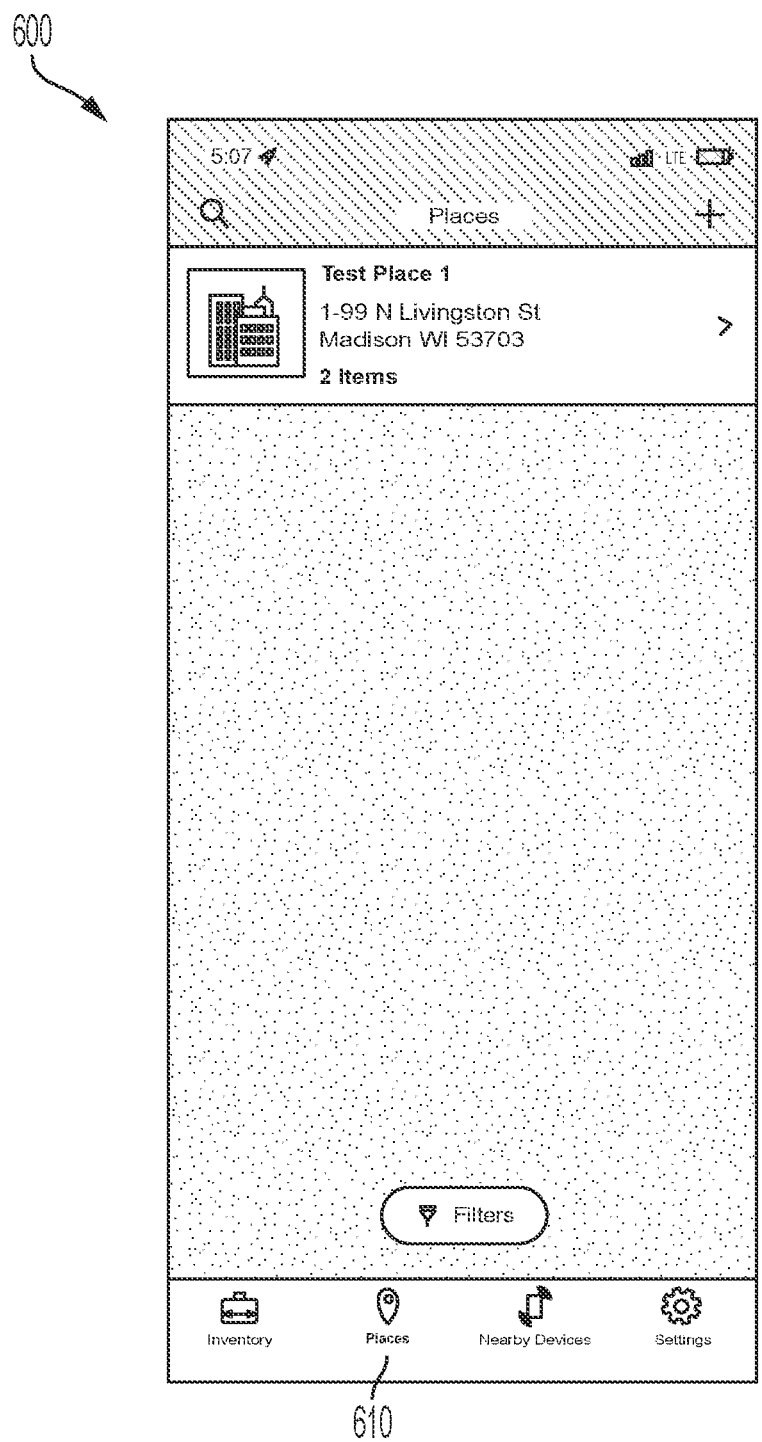
FIG. 6 illustrates a graphical user interface of the mobile communications device of FIG. 2 in accordance with some embodiments.

An organizational user can add and configure locations on the mobile communications device 110 using an application executed by the mobile communications device 110. FIG. 6 illustrates a second dashboard 600 generated by the electronic processor 210. The second dashboard 600 is generated in response to receipt of a user request to launch the mobile application and a selection of a places option 610. The user may use the second dashboard 600 to add and configure locations. For example, the organization user can setup each worksite of one or more projects of the organization. For example, the electronic processor 210 characterizes a location in response to receipt of user input indicating a name 512, a phone number 514, a job number 516, and a division 518 for the location as shown in FIG. 5. The user may also provide an address for the location, an image to be used as an icon for the location, and a date range for the job at the location. The name 512, phone number 514, cost code 516, and the division 518 for the location are displayed in the location information section of the dashboard 500. The location address is displayed in the location address section 520 of the dashboard 500. An individual user may similarly add location(s), for example, a home location using the mobile application. In response to receipt of a user selection of one of the locations registered in the mobile application, the electronic processor 210 generates and displays the dashboard 500.

Figure 7:
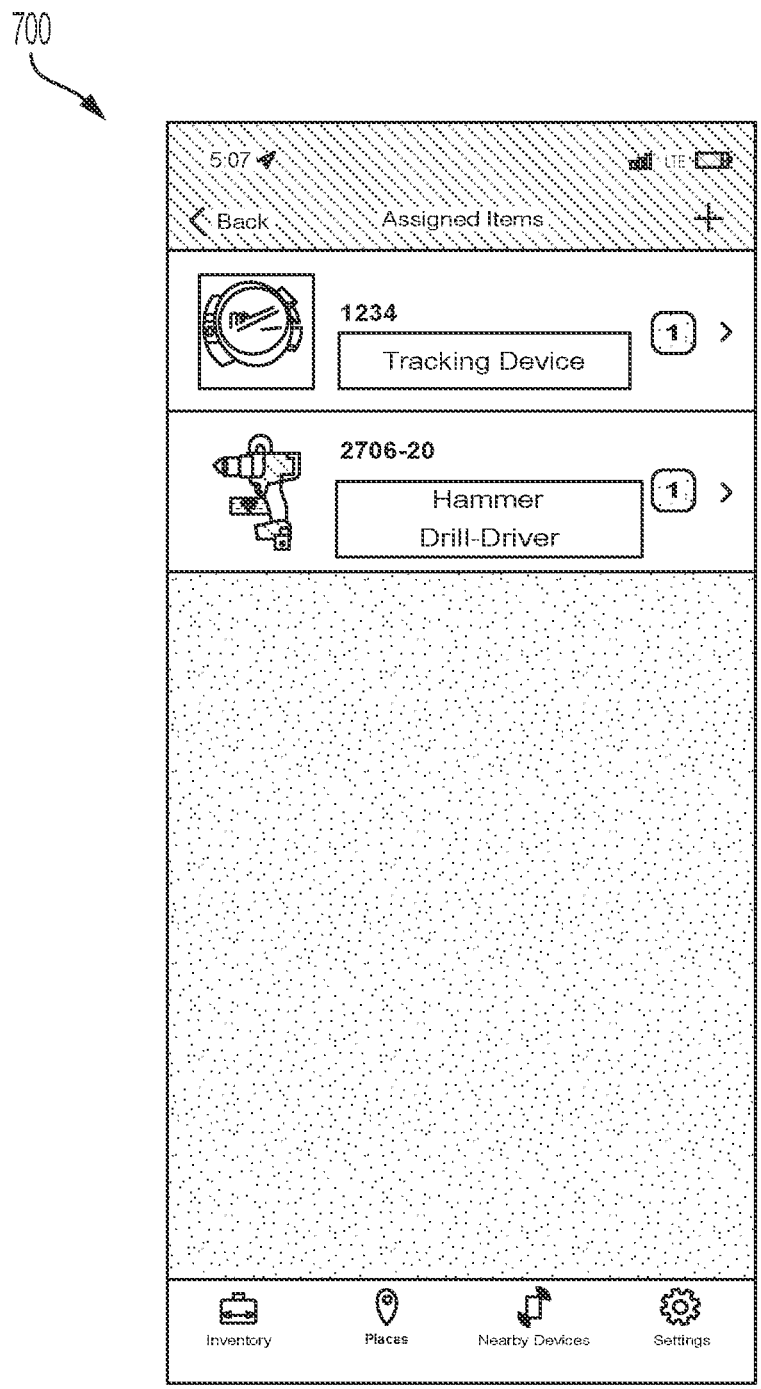
FIG. 7 illustrates a graphical user interface of the mobile communications device of FIG. 2 in accordance with some embodiments.

When the locations are setup in the mobile application, the user can add and/or assign power tool devices 120 to each location. Particularly, the user may add nearby power tool devices 120 to the user's inventory and assign the nearby power tool devices 120 to the current location. The power tool devices 120 assigned to the current location may be viewed by selecting an assigned items selection 542 in the inventory section 540. FIG. 7 illustrates a third dashboard 700 generated by the electronic processor 210 that displays the power tool devices 120 assigned to a particular location. Particularly, the third dashboard 700 displays identification information of the power tool devices 120 assigned to the particular location.

The user may also assign other users or other mobile communications devices 110 to the current location. The users assigned to the current location can access the tools at the current location. For example, the assigned users may use their mobile communications device 110 to lock and unlock tools at the current location for operation. The users assigned to the current location may be viewed by selecting an assigned people selection 544 in the inventory section 540.

The mobile communications devices 110 forward the location and inventory information for storage on the remote server 130. The location and inventory information stored on the remote server 130 can be accessed by other mobile communications devices 110 that belong to the organization, as well as by the mobile communications device 110 that forward the location and inventory information at a later time.

The tool stats section 530 displays information regarding the power tool devices 120 in the inventory. In the example illustrated, the tool stats section 530 displays number of power tool devices 120 marked as missing 532, number of power tool devices 120 that need service 534, number of power tool devices 120 not seen in a particular number of days 536, and a number of power tool devices 120 seen outside a geofence 538. The user of the mobile application can mark the power tool devices 120 as missing if they cannot be found at any of the locations by navigating through the mobile application graphical user interface. In some embodiments, the one or more mobile communications devices 110 may mark the power tool devices 120 as missing when the mobile communications devices 110 cannot communicate with the power tool devices 120 at any of the registered locations for a certain number of days.

The one or more mobile communications devices 110 similarly mark the power tool devices 120 as not seen in a particular number of days when the mobile communications devices 110 have not communicated with the power tool devices 120 for that particular number of days at any of the registered locations. For example, as previously noted, the mobile communications devices 110 transmit to the remote server 130 identification and current location information for power tool devices 120 that the mobile communications devices 110 encounter (i.e., become within wireless communication range), and the remote server 130 stores the received current location information as the last seen location for each power tool device 120. When the remote server 130 determines that the last seen location for one of the power tool devices 120 occurred more than the particular number of days before the current date (i.e., current date–last seen date>particular number of days), the remote server 130 indicates to the mobile communications device 110 that the power tool device 120 has not been seen for the particular number of days. The mobile communications device 110 then updates (i.e., increments) the not seen in a particular number of days statistic 536 in the tool stats section 530. When a power tool device 120 previously determined to not have been seen for a particular number of days later comes into wireless communication with one of the mobile communications devices 110, the mobile communications device 110 sends the identifying information of the power tool device 120 and the current location of the mobile communications device 110 to the remote server 130. The remote server 130 then updates the last seen location and date for the power tool device 120, and sends a notification to the mobile communications devices 110 having that power tool device 120 in an associated inventory that the power tool device 120 has been seen. The mobile communications device 110 then updates (i.e., decrements) the not seen in a particular number of days statistic 536 in the tool stats section 530. In some embodiments, the incrementing and decrementing for the not seen in a particular number of days statistic 536 is performed at the remote server 130, the statistic is provided to the mobile communications device 110 to update the particular number of days statistic displayed in the tool stats section 530.

In some embodiments, the power tool devices 120 communicate sensor and other data to the mobile communications devices 110. A power tool device 120 may also communicate that the power tool device 120 needs service. Alternatively, the mobile communications device 110 may determine that the power tool device 120 may need service in response to data received from the power tool device 120 or the remote server 130. In some embodiments, a user may select a power tool device 120 from the inventory and select an option for service. The mobile communications device 110 then displays the number of power tool devices that need service in the tool stats section 530.

Figure 8:
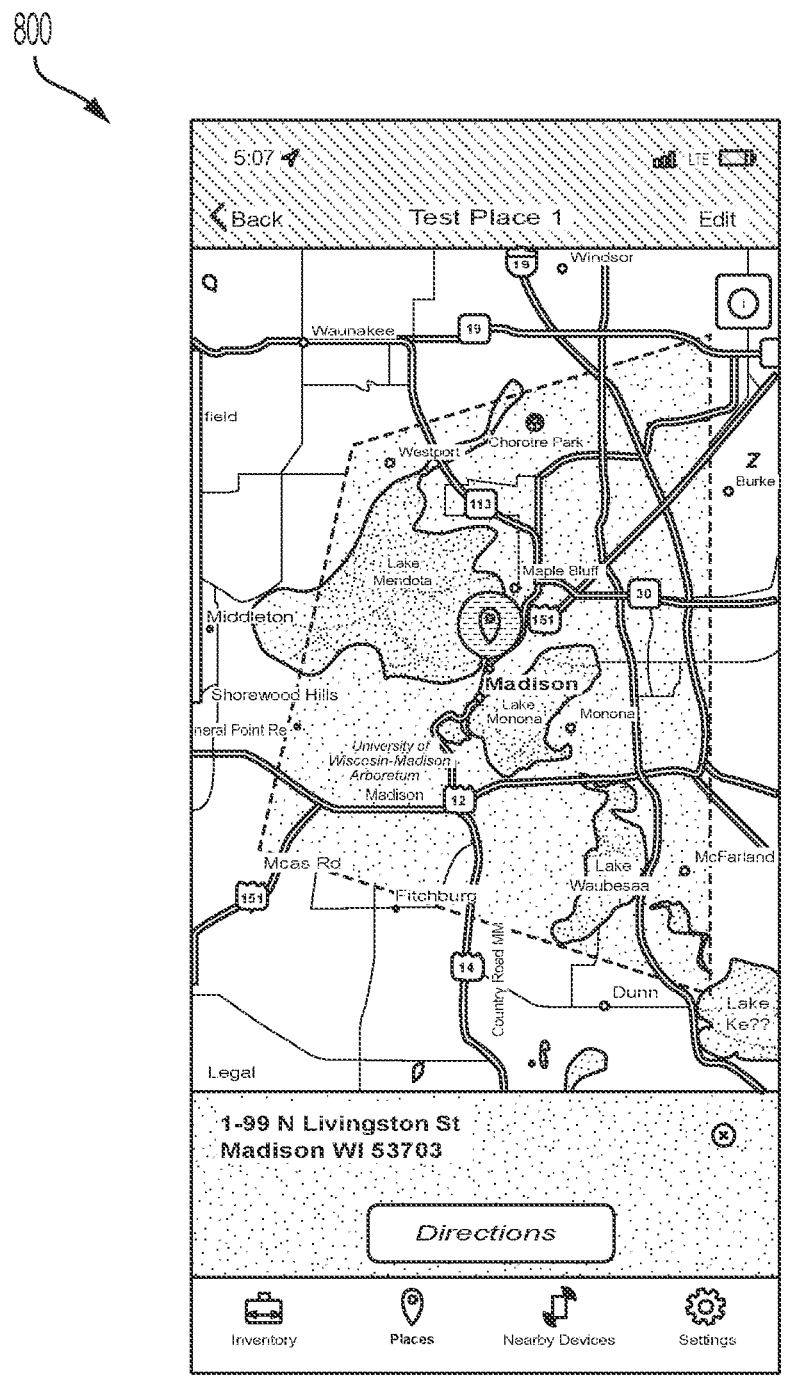
FIG. 8 illustrates a graphical user interface of the mobile communications device of FIG. 2 in accordance with some embodiments.

In some embodiments, the user may select a geofence setup option 545 to setup a geofence around the location. FIG. 8 illustrates a fourth dashboard 800 for setting up a geofence for the current location. As illustrated in FIG. 8, a user may set up a boundary around the current location. For example, the mobile communications device may receive an initial location selection via the electronic display 260 (e.g., by dragging and dropping a pin on the illustrated map). The mobile communications device 110 then generates a default geofence boundary that is displayed on the map, and receives user boundary input modifications via the electronic display 260 (e.g., through a user dragging boundary corners or points). Once a geofence is defined, the mobile communications device 110 transmits the geofence definition to the remote server 130. The remote server 130 associates the geofence with the location and location-based inventory. The remote server 130 further compares the last seen location information for each power tool device 120 of the associated inventory, and determines whether each of the power tool devices 120 is within or outside the geofence. One example method for determining whether a power tool device 120 is within or outside the geofence is explained below with respect to FIG. 12. The remote server 130 then transmits the results of the comparison to the mobile communications device 110, for example, by transmitting an indication of whether each power tool device 120 of the associated inventory was determined to be inside the geofence or outside the geofence. Returning to the dashboard 500 of FIG. 5, the tool statistic, seen outside the geofence 538, is updated to indicate the number of the power tool devices 120 of the associated inventory that are outside of the geofence 538, determined by the mobile communications device 110 based on the information received from the remote server 130 (e.g., by incrementing and decrementing a counter for each of the power tool devices 120 indicated outside of the geofence and inside the geofence, respectively).

Figure 9:
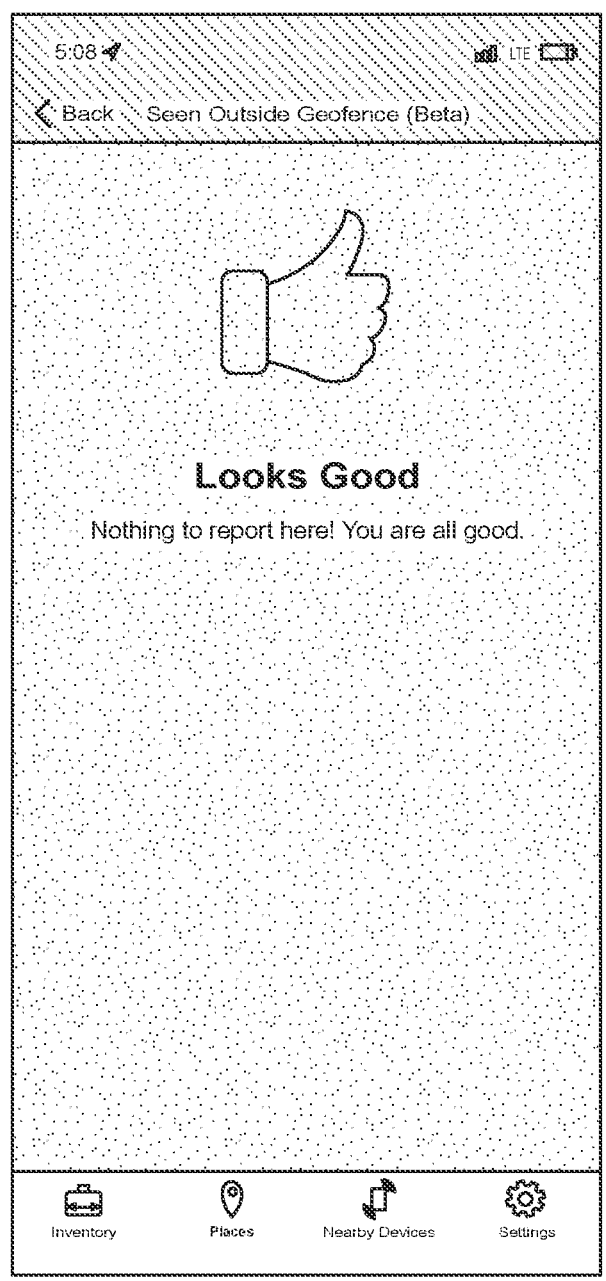
FIG. 9 illustrates a graphical user interface of the mobile communications device of FIG. 2 in accordance with some embodiments.

FIG. 9 illustrates a fifth dashboard 900 that shows a number of tools found outside the geofence boundary set up by the user of the mobile application. The fifth dashboard 900 is generated by the electronic processor 210 when the user selects the seen outside geofence 538 option in the dashboard 500. The fifth dashboard 900 displays the identification information of the power tool devices 120 found outside the geofence boundary of the current location.

Figure 10:
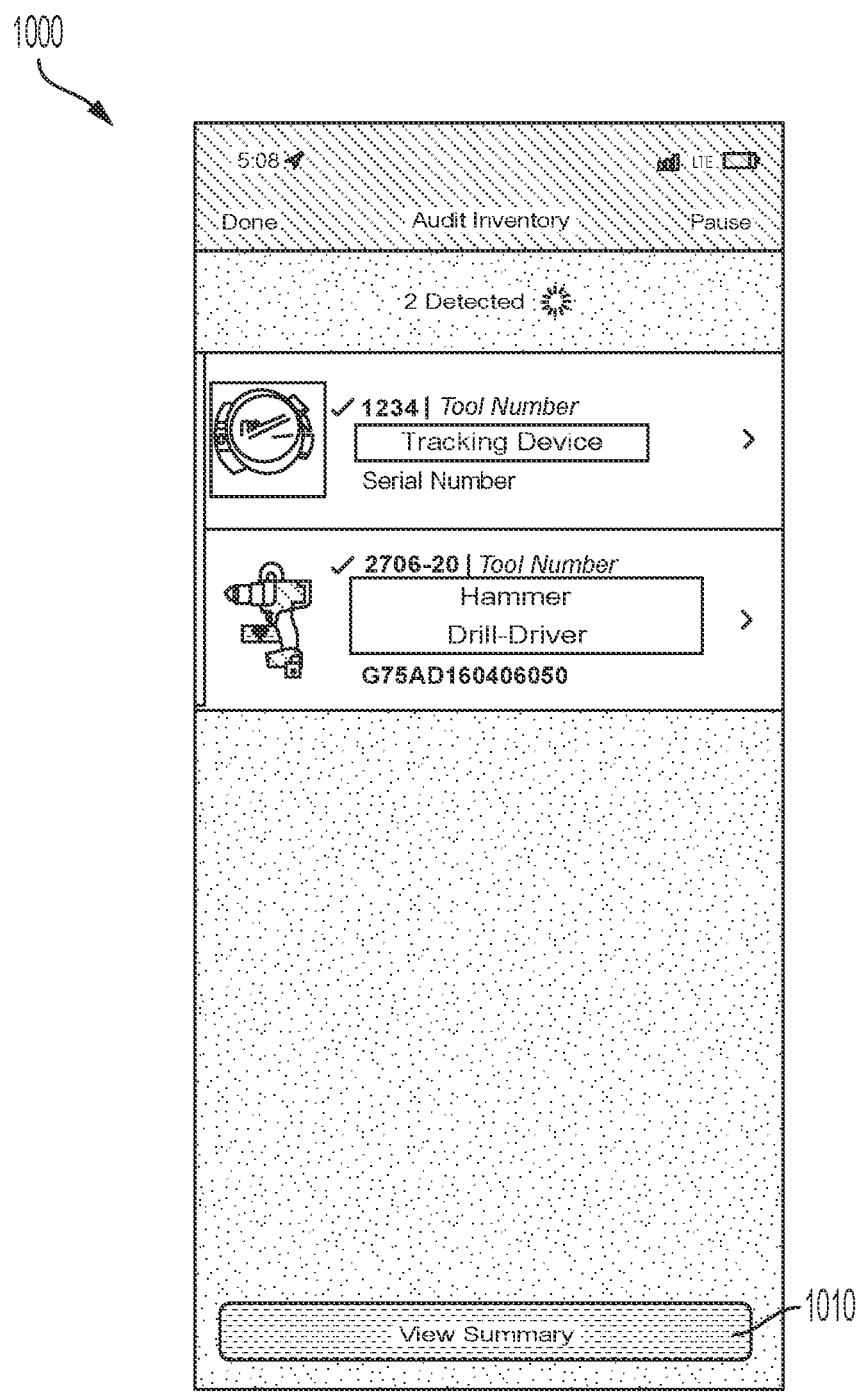
FIG. 10 illustrates a graphical user interface of the mobile communications device of FIG. 2 in accordance with some embodiments.

FIG. 10 illustrates a sixth dashboard 1000 that shows an audit of the inventory at the current location. The sixth dashboard 1000 is generated by the electronic processor 210 in response to receipt of a user selection of an audit inventory option 546 on the dashboard 500. The sixth dashboard 1000 displays identification information of the power tool devices 120 in the inventory that are assigned to the current location. For example, the electronic processor 210 access inventory information stored in the memory 220, in the remote server 130, or both, for inclusion in the sixth dashboard 1000. Further, the electronic processor 210 determines which of the power tool devices 120 in the inventory have been marked as missing (e.g., information obtained from the remote server 130), which of the power tool devices 120 in the inventory are outside of the associated geofence (e.g., information obtained from the remote server 130) and which of the power tool device 120 in the inventory are outside of communication range with the transceiver 230 of the mobile communications device 110 (e.g., based on a lack of receipt of a signal by the transceiver 230 from the power tool devices 120 for a predetermined time period). The electronic processor 210 may also provide colored indications by the identification information of the power tool devices 120 based on the status of the power tool devices 120. For example, the electronic processor 210 may provide a first indication (e.g., a green border) by the identification information of the power tool devices 120 that can be found at the current location and do not need service, provide a second indication (e.g., a red border) by the identification information of all power tool devices 120 that need service, and provide a third indication (e.g., a gray border) by the identification information of the power tool devices 120 that are marked as missing, are found outside the geofence boundary of the current location, or are outside of communication range with the mobile communications device 110 on which the inventory audit was initiated.

Figure 11:
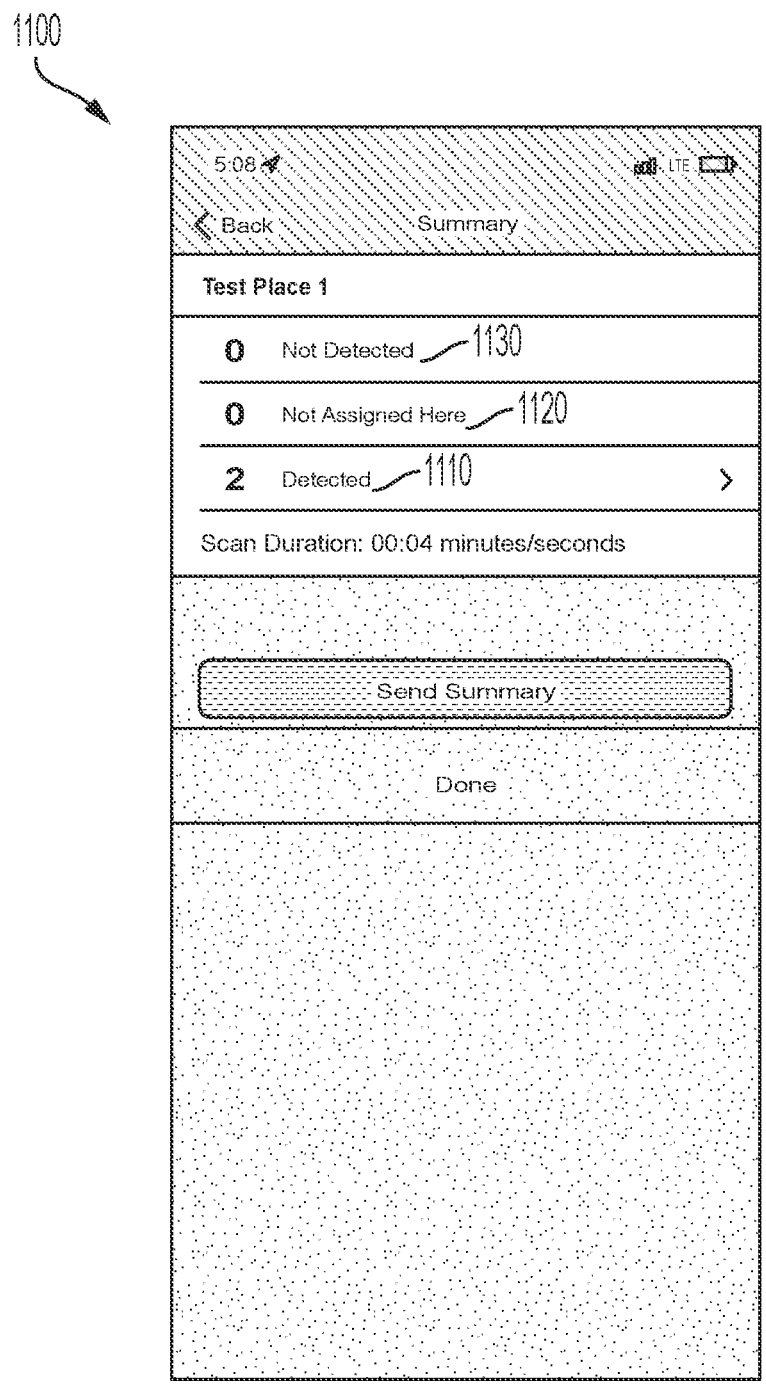
FIG. 11 illustrates a graphical user interface of the mobile communications device of FIG. 2 in accordance with some embodiments.

The user of the mobile application may also request a summary of the inventory at the current location by selecting a view summary option 1010 on the sixth dashboard 1000. FIG. 11 illustrates a summary dashboard 1100 generated by the electronic processor 210 in response to receipt of a user selection of the view summary option 1010. The summary dashboard 1100 displays additional tool statistics of the power tool devices 120. Particularly, the summary dashboard 1100 displays a number of power tool devices 120 in the inventory assigned to the current location and detected at the current location 1110, a number of power tool devices 120 in the inventory not assigned to the current location and detected at the current location 1120, and a number of power tool devices 120 in the inventory not detected at the current location 1130. In some embodiments, the user also has the option to receive periodic summary emails (for example, weekly emails) generated by the remote server 130. The summary emails may provide the tool statistics of the power tool devices 120, for example, the number of power tool devices 120 in the inventory assigned to the current location and detected at the current location, the number of power tool devices 120 in the inventory not assigned to the current location and detected at the current location 1120, and the number of power tool devices 120 in the inventory not detected at the current location 1130.

Returning to FIG. 4, the method 400 also includes displaying, using the electronic processor 210, the dashboard 500 on the electronic display 260 (at block 430). The electronic processor 210 causes the dashboards 500, 600, 700, 800, 900, 1000, 1100 to be displayed on the electronic display 260 of the mobile communications device 110.

Figure 12:
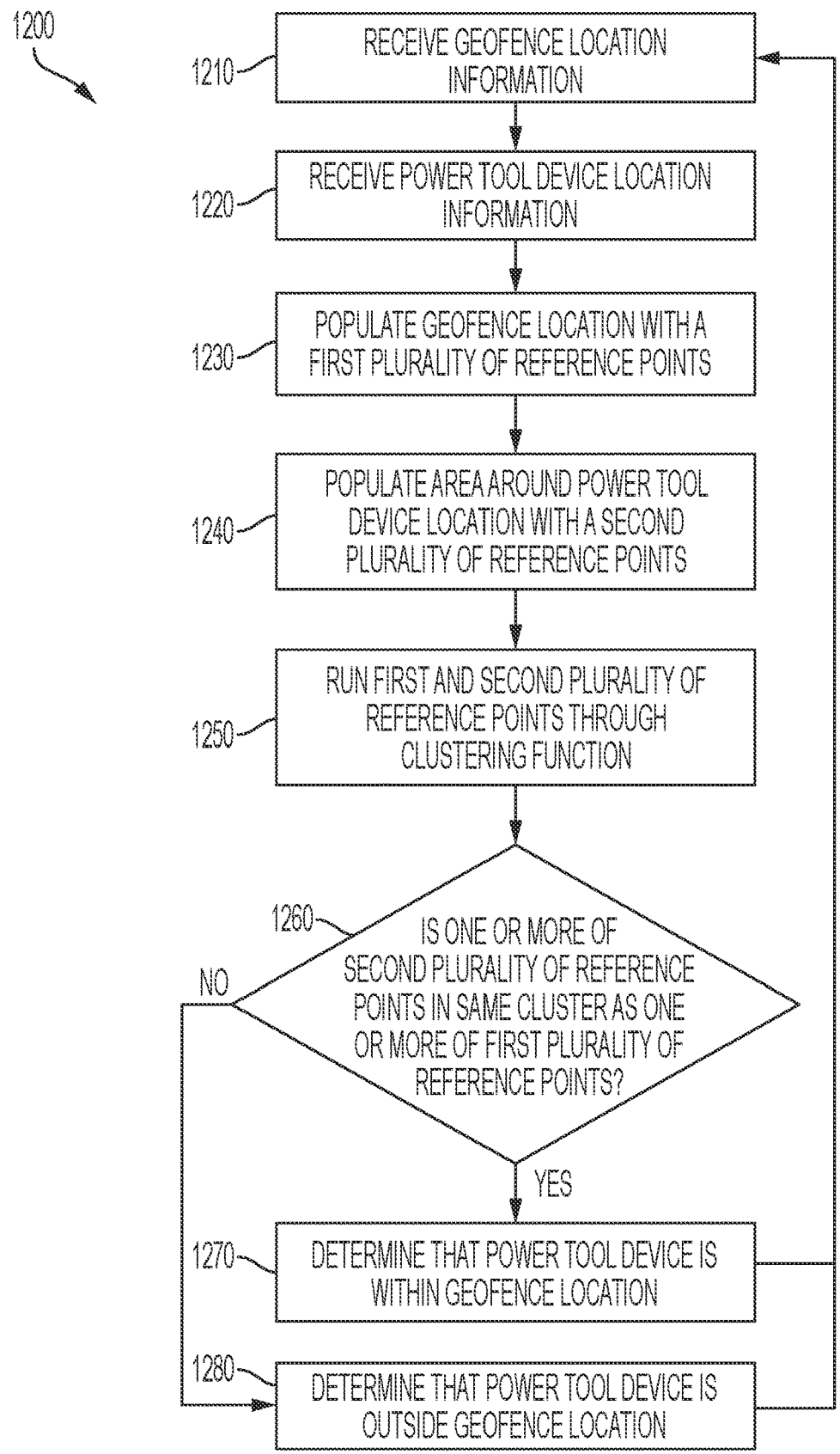
FIG. 12 is a flowchart of a method for determining a location of a power tool with respect to a geofence using a clustering technique in accordance with some embodiments.

As discussed above, in some embodiments, the remote server 130 determines whether each power tool device 120 is within or outside a geofence. FIG. 12 is a flowchart of one example method 1200 for determining a location of a power tool device 120 with respect to a geofence using a clustering technique. In the example illustrated, the method 1200 includes receiving geofence location information (for example, a geofence boundary or a modified geofence boundary) (at block 1210). Referring to FIG. 8, a user may set up a geofence on the fourth dashboard 800 by using the user interface 240 to manipulate a boundary region on a map. In some embodiments, the geofence may be a continuous area within a boundary or may include two or more areas having separate boundaries. FIG. 8 illustrates an example of a geofence including a continuous area. In some situations, a user may set up a geofence that includes, for example, two building but excluding the street or area between the two buildings. In these situations, the user may setup a first area by drawing a first border around a first building on the map and may setup a second area by drawing a second border around a second building on the map. Once a geofence is defined, the mobile communications device 110 transmits the geofence definition (i.e., the geofence location information) to the remote server 130.

Figure 13A:
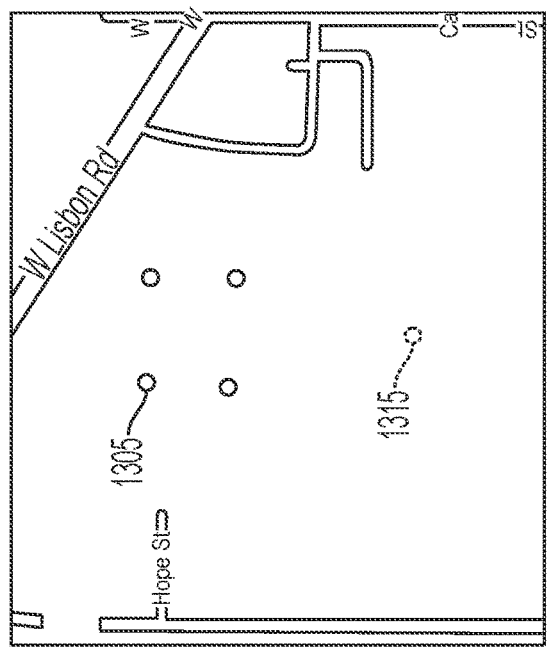
FIGS. 13A, 13B, 13C, and 13D illustrate examples of using the clustering technique referred to with respect to the flowchart of FIG. 12.
Figure 13B:
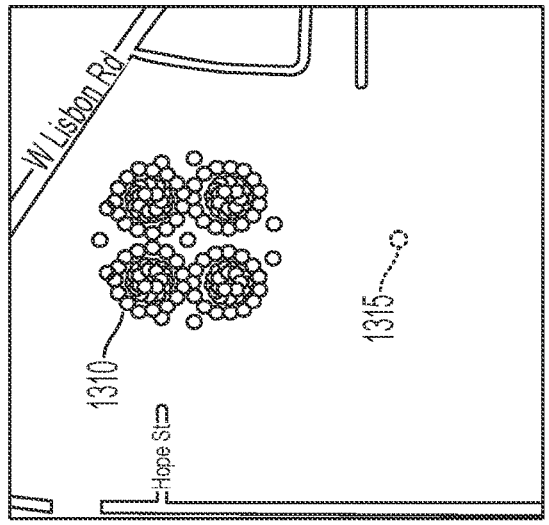

The method 1200 also includes receiving power tool device 120 location information (at block 1220). As explained above with respect to block 410 of FIG. 4, the mobile communications device 110 determines a location of the power tool devices 120 and transmits the location of the power tool devices 120 along with the identification information of the power tool devices 120 to the remote server 130. Additionally, in some embodiments, one or more of the power tool devices 120 includes a GPS receiver for determining its own location independent of the mobile communications devices 110, and a long range wireless transceiver to, independent of the mobile communications devices 110, communicate the identification information along with the determined location information to the remote server 130 for storage as the last seen location. The method 1200 also includes populating the geofence location with a first plurality of reference points (at block 1230). The remote server 130 populates the area of the geofence location with the first plurality of reference points. For example, referring to FIG. 13A, the remote server 130 may begin by plotting the locations of the geofence (e.g., the boundary points 1305) and the power tool device 120. FIG. 13B illustrates the geofence location populated with the first plurality of reference points 1310. The first plurality of reference points may be placed equidistant from each other within the boundaries of the geofence location. In some embodiments, some of the first plurality of reference points may be provided just outside the boundaries of the geofence location to account or adjust for errors in the received location or the geofence location. The number or density of the first plurality of reference points may be varied based on the accuracy specifications for the system 100. In some embodiments, the spacing of the first plurality of reference points depends on the size of the geofence location. For example, a large geofence may include more spacing between the first plurality of reference points and a small geofence may include less spacing between the first plurality of reference points.

Figure 13C:
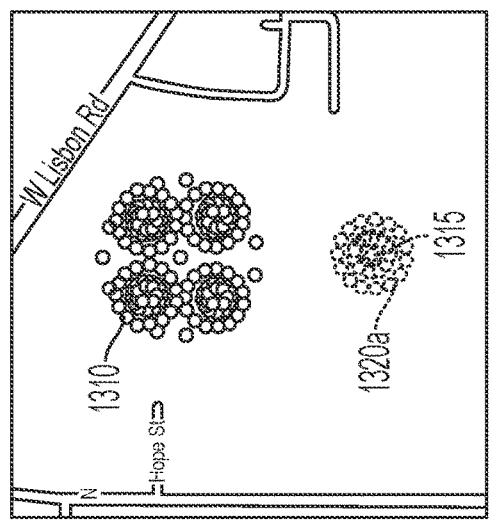
Figure 13D:
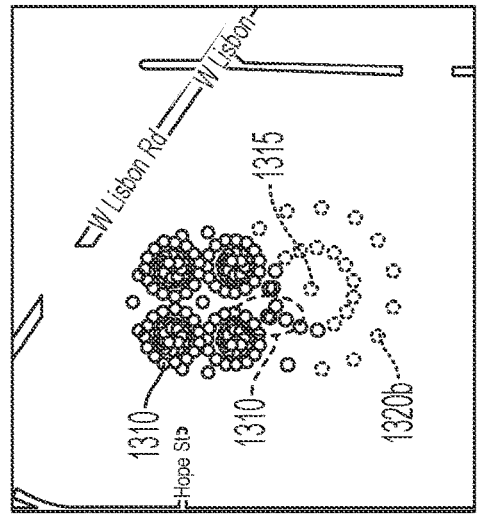

The method 1200 further includes populating an area around the location 1315 of the power tool device 120 with a second plurality of reference points (at block 1240). In some embodiments, the remote server 130 populates the area within the location of the power tool device 120 with the second plurality of reference points. In other embodiments, the remote server 130 expands the area of the power tool device 120 location and populates the expanded area with the second plurality of reference points. FIG. 13C and FIG. 13D illustrate the power tool device 120 location populated with the second plurality of reference points 1320a and 1320b, respectively. The area and the number or density of second plurality of reference points may be adjusted based on the accuracy specifications for the system 100. For example, when the system has higher accuracy specifications, the second plurality of reference points 1320a may be compactly grouped near the location 1315 of the power tool device 120, such as illustrated in FIG. 13C. When the system has lower accuracy specifications, the second plurality of reference points may be less compactly grouped near the location 1315, such as illustrated in FIG. 13D.

The method 1200 also includes the remote server 130 running the first plurality of reference points and the second plurality of reference points through a clustering function (at block 1250). In other words, the clustering function is executed, by the remote server 130, using the first and second plurality of reference points as inputs to the function. Various clustering functions may be used by the remote server 130, such as a K-means clustering function, a means-shift clustering algorithm, a density-based spatial clustering of applications with noise (DBSCAN) function, or a hierarchical clustering function. For example, in some embodiments, the clustering function receives a distance value and a plurality of reference points and outputs one or more clusters. Each cluster including a subset of the plurality of reference points. A subset of the plurality of reference points are grouped together into a cluster when each one of the subset of the plurality of reference points is within the distance value away from at least one other of the subset of the plurality of reference points.

The method 1200 further includes determining whether at least one of the second plurality of reference points is in a same cluster as one of the first plurality of reference points (at block 1260). The remote server 130 may examine each of the one or more clusters output from the clustering function to determine whether at least one of the one or more clusters includes at least one of the first plurality of reference points and at least one of the second plurality of reference points. For example, the remote server 130 may compare the reference points in each cluster to the list of first and second reference points to identify matches to determine whether the clusters include at least one of the first reference points and at least one of the second reference points.

When the remote server 130 determines that at least one of the second plurality of reference points is in the same cluster as one of the first plurality of reference points, the method 1200 includes determining that the power tool device 120 is within the geofence location (at block 1270). The remote server 130 transmits an indication to the mobile communications device 110 that the power tool device 120 is within the geofence location and the mobile communications device 110 displays that the power tool device 120 is within the geofence location, for example, on the second dashboard 600.

When the remote server 130 determines that no cluster includes both at least one of the second plurality of reference points and at least one of the first plurality of reference points, the method 1200 includes determining, by the remote server 130, that the power tool device 120 is outside the geofence location (at block 1280). The remote server 130 transmits an indication to the mobile communications device 110 that the power tool device 120 is outside of the geofence location and the mobile communications device 110 displays that the power tool device 120 is outside of the geofence location, for example, on the fifth dashboard 900.

In the example of FIG. 13C, because the spacing between the first plurality of reference points 1310 and the second plurality of reference points 1320a of the power tool device 120 is significant, the clustering function executed using these points as inputs is unlikely to result in at least one cluster having at least one of the first plurality of reference points and at least one of the second plurality of reference points. In such an example, the power tool device 120 would be determined to be outside of the geofence. In the example of FIG. 13D, because at least some of the second plurality of reference points 1320a overlap with the area of the first plurality of reference points 1310, the clustering function executed using these points as inputs is likely to result in at least one cluster having at least one of the first plurality of reference points and at least one of the second plurality of reference points. In FIG. 13D, an example of a cluster 1325 is illustrated having at least one of the first plurality of reference points and at least one of the second plurality of reference points. In such an example, the power tool device 120 would be determined to be within the geofence. Similar techniques as described in method 1200 may also be used to determine whether any of the power tool devices 120 are within any other geofences defined by the user. In addition, the summary email generated by the remote server 130 described above may also provide information regarding whether any of the power tool devices 120 were found in any geofences defined by the user.

Generally, the clustering technique reduces the likelihood of incorrectly determining that the power tool device 120 is outside of the geofence due to location anomalies (e.g., temporarily inaccurate GPS location information for the power tool device 120). In other words, the clustering technique can reduce false positives inaccurately indicating that the power tool device 120 is outside of the geofence.

In some embodiments, the requirement for the number of first reference points and the number of second references points to be present in the same cluster to determine that the power tool device 120 is within the geofence may be varied based on the accuracy specifications of the system 100. For example, based on the accuracy specifications, the remote server 130 may looks for at least one of the second plurality of reference points to be in the same cluster as at least four of the first plurality of reference points, or the like.

Thus, embodiments described herein provide, among other things, a power tool geofence tracking system and corresponding dashboard. The various dashboards generated by the mobile communications devices 110 provide, among other things, improved usability through efficient tracking data aggregation, analysis, and presentation. For example, in some embodiments, the mobile communications devices 110 determine tool tracking statistics and generate dashboards that simultaneously display multiple tool tracking statistics along with identifying information and configuration options.

What is claimed is:

1. A method for power tool geofence tracking and dashboard display on a mobile communications device comprising:
   determining, using an electronic processor and a transceiver, a location of one or more power tool devices;
   generating, using the electronic processor, a dashboard to simultaneously display:
      an identity and location associated with a tool inventory,
      a link to a geofence boundary setup screen, wherein the geofence boundary setup screen is configured to define a geofence boundary for the tool inventory, and
      inventory data of the tool inventory including an indication of a number of missing tools, a number of tools with suggested service, a number of tools missing for a specified period of time, and a number of tools outside of the geofence boundary; and
   displaying, using the electronic processor, the dashboard on an electronic display.

2. The method of claim 1, further comprising:
   receiving a selection of an initial location;
   generating a default geofence boundary based on the initial location; and
   displaying the default geofence boundary on the electronic display.

3. The method of claim 2, further comprising:
   receiving, via the electronic display, a user boundary input modification to modify the default geofence boundary;
   generating a modified geofence boundary based on the user boundary input modification; and
   displaying the modified geofence boundary on the electronic display.

4. The method of claim 3, further comprising transmitting the modified geofence boundary to a remote server; and associating, with the remote server, the modified geofence boundary with the initial location and a location-based inventory.

5. The method of claim 4, further comprising transmitting the location of the one or more power tool devices to the remote server.

6. The method of claim 5, further comprising:
   populating the modified geofence boundary with a first plurality of reference points;
   populating an area around the one or more power tool devices with a second plurality of reference points;
   running the first plurality of reference points and the second plurality of reference points through a clustering function;
   determining whether one or more of the second plurality of reference points is in a same cluster as one or more of the first plurality of reference points; and
   determining that the one or more power tool devices is within the modified geofence boundary when one or more of the second plurality of reference points is in the same cluster as one or more of the first plurality of reference points.

7. The method of claim 6, further comprising transmitting an indication to the mobile communications device that the one or more power tool devices is within the modified geofence boundary.

8. A system for power tool geofence tracking comprising:
   a mobile communications device including:
      a transceiver configured to enable communications between the mobile communications device, a remote server, and one or more power tool devices;
      an electronic display; and
      an electronic processor communicatively coupled to the transceiver and the electronic display and configured to:
         determine a location of the one or more power tool devices,
         generate a dashboard to simultaneously display:
            an identity and location associated with a tool inventory,
            a link to a geofence boundary setup screen, wherein the geofence boundary setup screen is configured to define a geofence boundary for the tool inventory, and
            inventory data of the tool inventory including an indication of a number of missing tools, a number of tools with suggested service, a number of tools missing for a specified period of time, and a number of tools outside of the geofence boundary, and
         display, on the electronic display, the dashboard.

9. The system of claim 8, wherein the electronic processor is further configured to:
   receive, via the electronic display, a selection of an initial location;
   generate a default geofence boundary based on the initial location; and
   display the default geofence boundary on the electronic display.

10. The system of claim 9, wherein the electronic processor is further configured to:
    receive, via the electronic display, a user boundary input modification to modify the default geofence boundary;
    generate a modified geofence boundary based on the user boundary input modification; and
    display the modified geofence boundary on the electronic display.

11. The system of claim 10, wherein the electronic processor is further configured to:
    transmit, via the transceiver, the modified geofence boundary to the remote server, wherein the remote server is configured to associate the modified geofence boundary with the initial location and a location-based inventory; and
    transmit, via the transceiver, the location of the one or more power tool devices to the remote server.

12. The system of claim 11, wherein the remote server is configured to:
    populate the modified geofence boundary with a first plurality of reference points;
    populate an area around the one or more power tool devices with a second plurality of reference points;
    run the first plurality of reference points and the second plurality of reference points through a clustering function;
    determine whether one or more of the second plurality of reference points is in a same cluster as one or more of the first plurality of reference points;
    determine that the one or more power tool devices is within the modified geofence boundary when one or more of the second plurality of reference points is in the same cluster as one or more of the first plurality of reference points.

13. The system of claim 12, wherein the remote server is configured to transmit an indication to the mobile communications device that the one or more power tool devices is within the modified geofence boundary.

* * * * *